United States Patent
Burr et al.

(10) Patent No.: US 7,193,208 B1
(45) Date of Patent: Mar. 20, 2007

(54) TIME-OF-FLIGHT CAPABLE HIGH RESOLUTION PET DETECTOR

(75) Inventors: Kent Burr, Latham, NY (US); Adrian Ivan, Niskayuna, NY (US); James Leblanc, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/257,207

(22) Filed: Oct. 24, 2005

(51) Int. Cl.
   *G01T 1/20* (2006.01)
(52) U.S. Cl. .................................. 250/300; 250/362
(58) Field of Classification Search ................ 250/300, 250/362
   See application file for complete search history.

(56) References Cited

U.S. PATENT DOCUMENTS

| | | | |
|---|---|---|---|
| 5,021,854 A * | 6/1991 | Huth | 257/438 |
| 5,500,376 A * | 3/1996 | Ishaque et al. | 438/73 |
| 5,757,057 A * | 5/1998 | Dabrowski | 257/438 |
| 6,111,299 A * | 8/2000 | Dabrowski et al. | 257/438 |
| 6,483,327 B1 * | 11/2002 | Bruce et al. | 324/752 |
| 6,781,133 B2 | 8/2004 | Karplus et al. | |
| 7,049,600 B2 * | 5/2006 | Levin | 250/363.04 |
| 2004/0232344 A1 * | 11/2004 | Karplus et al. | 250/370.1 |
| 2006/0192128 A1 * | 8/2006 | Benlloch Bavciera et al. | 250/369 |
| 2006/0197022 A1 * | 9/2006 | Burr et al. | 250/362 |

OTHER PUBLICATIONS

Pepin; "Properties of LYSO and Recent LSO Scintillators for Phoswich PET Detectors"; IEEE Transactions on Nuclear Science, Vo. 51, No. 3, Jun. 2004; pp. 789-795.

* cited by examiner

*Primary Examiner*—Otilia Gabor
(74) *Attorney, Agent, or Firm*—Fletcher Yoder (57) ABSTRACT

An array of position-sensitive avalanche photodiodes is provided in which output signal contacts from corners of each photodiode are grouped in common for readout. Each photodiode may be provided on a single wafer or chip, with photodiodes being separated by a trench or a groove. Corners of each photodiode include contacts for reading out signals resulting from gamma rays incident events in an adjacent scintillator. Grouping of the contacts into common output channels reduces the number of output channels, while still permitting localization of gamma ray incident events in the scintillator crystals. The photodiode array may be positioned adjacent to one face of a scintillator, with a photomultiplier tube to be positioned adjacent to another. The detector arrangement may be used for positron emission tomography imaging and similar techniques.

23 Claims, 5 Drawing Sheets

TIME-OF-FLIGHT CAPABLE HIGH RESOLUTION PET DETECTOR

BACKGROUND

The present invention relates generally to the field of photon detector arrays and acquisition of signals from such arrays. More particularly, the invention relates to a novel arrangement for extracting signals from a position-sensitive avalanche photodiode array such as for PET imaging.

A wide range of applications exist for photodiode arrays, particularly in imaging equipment. A variety of such photodiodes are known and are currently in use. For one particular type of photodiode, typically referred to as a position-sensitive avalanche photodiode (PSAPD), photons can be detected and located at positions where they impact the array. PSAPDs are currently used for medical and other imaging applications, such as positron emission tomography (PET) imaging. Their use is particularly of interest in such applications due to their ability to sense the position of photons impacting the array.

In PET imaging systems, an image is generated based upon the impact of radiation (generated by a nuclear decay event) with a scintillator. Gamma rays resulting from interaction of a positron and corresponding electron in a subject enter into the scintillator and are converted to photons that can be detected by optical sensors. For example, light emitted from a particular location in the subject may be detected using a PSAPD or other photo detector such as a photo multiplier tube (PMT).

PET detectors have been demonstrated that use dual-end readout arrangements, including PSAPDs and a fast single-channel PMT for simultaneously detecting data. In such arrangements, excellent timing resolution can be obtained for time-of-flight PET imaging, in addition to high spatial resolution and depth-of-interaction (DOI) capabilities. Such position, timing and energy information is generated for each gamma ray released in a subject and received by the scintillator.

PSAPDs used in experimental PET imaging systems have, however, been relatively small, such as on the order of 14 mm×14 mm. Such PSAPDs can be attached on one end of a scintillator array to provide position information, with the single-channel PMT on the opposite end to provide timing information. Energy information is determined by combining the signals from the PSAPD and the PMT, and the relative signal levels on the two detectors provide DOI information.

A typical PET imaging system includes a large number of such detector arrays, however. Thus, small PSAPDs such as those used in demonstrations require a large number of front-end electronic channels and time-intensive assembly and testing for practical applications. Moreover, when grouped into an actual imaging system, extraction of output signals from the PSAPDs requires relatively high density wiring, high-density electronics for processing signals, and so forth. Resulting operating temperatures can become elevated, leaving to degradation in the performance of the PSAPDs by increase in noise levels. Further improvements based upon these smaller sizes would appear to require reduction in temperatures well below room temperature, generally to be avoided in practical applications.

There is a need, therefore, for an improved position signal extraction technique from PSAPD arrays that avoids such drawbacks. In particular, there is a need for improved PSAPD arrays of larger size that can identify the location of incident radiation photons in a scintillator without substantially increasing the number of output channels for the sensed data.

BRIEF DESCRIPTION

The present invention provides a system and method for detecting data in a PSAPD array designed to respond to such needs. The technique may be used in a range of systems, but is particularly well-suited for PET imaging, single photon emission computed tomography (SPECT) imaging, optical imaging, and so forth. The system is based upon the use of multiple PSAPDs arranged on a single semiconductor chip or wafer. Each PSAPD produces output signals at corners thereof, which signals can be processed to determine a quadrant or region of the PSAPD in which a photon has impacted the array. The individual PSAPD may be separated by a small boundary from adjacent PSAPDs. Output from the conductors at corners of the PSAPDs are then grouped to reduce the number of total output channels of the assembly.

The PSAPD system may be associated with other components to form a detector, such as for use in a PET system. In particular, multiple PSAPDs with grouped outputs can be associated with a scintillator and, where desired, with a PMT for detection of data indicative of position, timing and energy.

The number of output channels from the PSAPD system can be significantly reduced from the maximum number that would result from a separate output channel at each of four corners of each PSAPD. In a present configuration, for example, an assembly of four PSAPDs can provide good position resolution with as few as six output channels. Various numbers of output channels may, however, be provided by grouping of the outputs as described in greater detail below.

The invention may also find application on other types and structures of photodetectors. For example, the common output channel technique described herein may be applied to charge sharing position-sensitive photosensors, such as position-sensitive multianode photomultipliers (PMTs) using charge division, position-sensitive photodiodes (without avalanche gain operation), arrays of silicon photomultipliers with charge sharing, and so forth

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
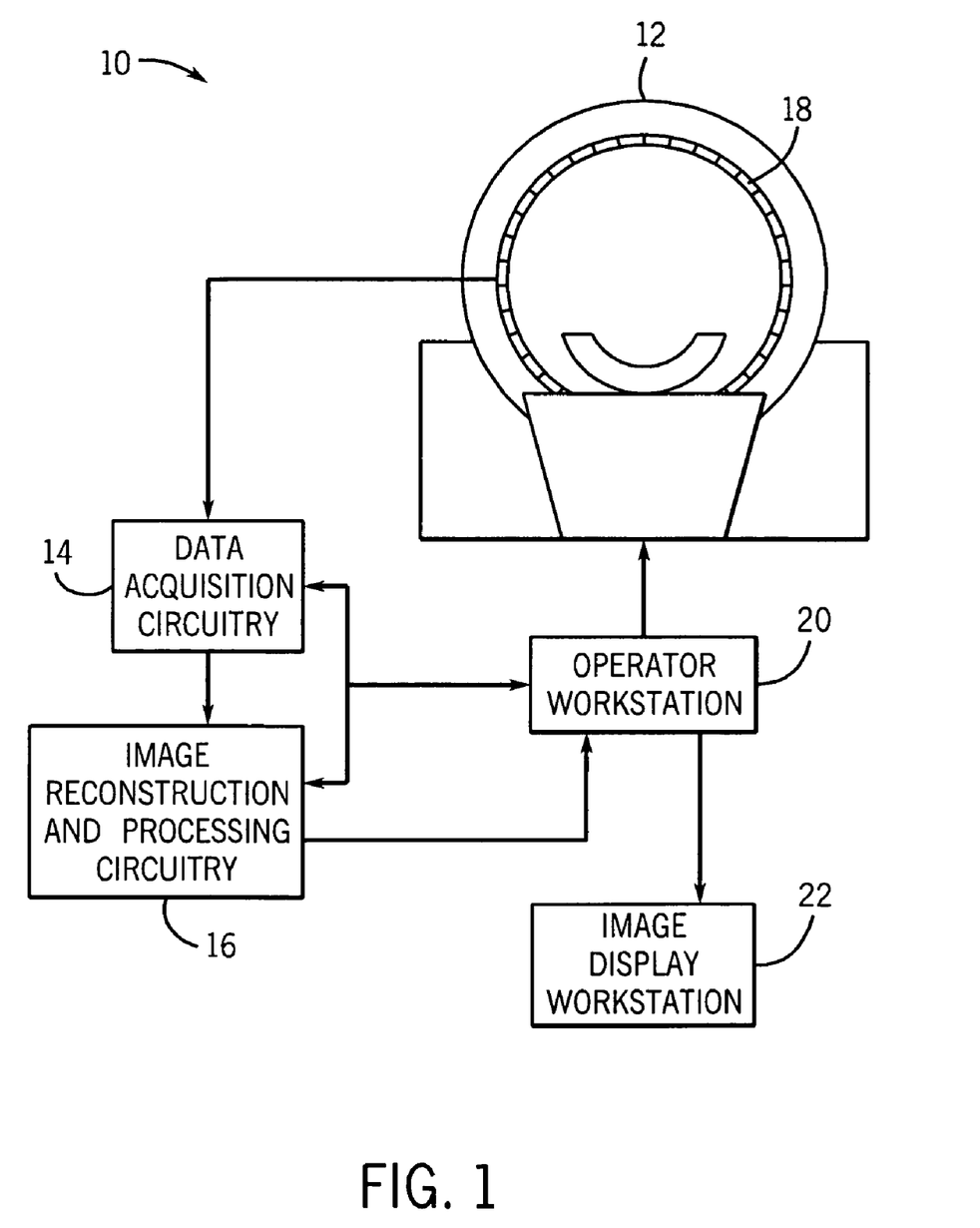
FIG. 1 is a diagrammatical representation of an exemplary PET imagining system employing a PSAPD array in accordance with aspects of the present technique.

Turning now to the drawings and referring first to FIG. 1, an exemplary PET system 10 operating in accordance with certain aspects of the present technique is illustrated. The PET system 10 includes a detector assembly 12, detector acquisition circuitry 14, and image reconstruction and processing circuitry 16. The detector assembly 12 typically includes a number of detector modules (generally designated by reference numeral 18) arranged in one or more rings, as depicted in FIG. 1. The PET system 10 also includes an operator workstation 20 and an image display workstation 22. While in the illustrated embodiment, the detector acquisition circuitry 14, and the image reconstruction and processing circuitry 16 are shown as being outside the detector assembly 12 and the operator workstation 20, in certain other implementations, some or all of these circuitries may be provided as part of the detector assembly 12 and/or the operator workstation 20. Each of the aforementioned components would be discussed in greater detail in the sections that follow.

Keeping in mind the exemplary PET system 10 above, or the corresponding components of other types of nuclear imaging systems, a brief description of the functioning of such a system is provided to facilitate further discussion of the present technique. PET imaging is primarily used to measure metabolic activities that occur in tissues and organs. In particular, PET imaging typically generates functional images of biological and metabolic activity as opposed to structural images generated by imaging modalities such as magnetic resonance imaging (MRI) and computed tomography (CT).

In PET imaging, the patient is typically injected with a solution that contains a radioactive tracer. The solution is distributed and absorbed throughout the body in different degrees, depending on the tracer employed and the functioning of the organs and tissues. For instance, tumors typically process more glucose than a healthy tissue of the same type. Therefore, a glucose solution containing a radioactive tracer may be disproportionately metabolized by a tumor, allowing the tumor to be located and visualized by the radioactive emissions. In particular, the radioactive tracer emits positrons that interact with and annihilate complementary electrons to generate gamma rays. In each annihilation reaction, two gamma rays traveling in opposite directions are emitted. In a PET imaging system 10, the pair of gamma rays are detected by the detector assembly 12 configured to ascertain that two gamma rays detected sufficiently close in time are generated by the same annihilation reaction. Due to the nature of the annihilation reaction, the detection of such a pair of gamma rays may be used to determine the line of response along which the gamma rays traveled before impacting the detector, allowing localization of the annihilation event to that line. By detecting a number of such gamma ray pairs, and calculating the corresponding lines traveled by these pairs, the concentration of the radioactive tracer in different parts of the body may be determined and a tumor, thereby, may be detected. Therefore, accurate detection and localization of the gamma rays forms a fundamental and foremost objective of the PET system 10.

In view of these comments, and returning now to FIG. 1, the detector acquisition circuitry 14 is adapted to read out signals generated in response to the gamma rays from the detector modules 18 of the detector assembly 12. The signals acquired by the detector acquisition circuitry 14 are provided to the image reconstruction and processing circuitry 16. The image reconstruction and processing circuitry generates an image based on the derived gamma ray emission locations. The operator workstation 20 is utilized by a system operator to provide control instructions to some or all of the described components and for configuring the various operating parameters that aid in data acquisition and image generation. The operating workstation 20 may also display the generated image. Alternatively, the generated image may be displayed at a remote viewing workstation, such as the image display workstation 22.

The detector assembly 12 may include a large number of detector modules 18. For example, in present arrangements, several rings of such modules may be provided with a number of modules per ring sufficient to surround the patient or subject being imaged. In the present invention, the detector modules are of a larger size than in previous arrangements, and consist of a number of PSAPDs arranged on a single chip or wafer. Moreover, the detector modules may include the PSAPDs along with a PMT as illustrated in FIG. 2.

Figure 2:
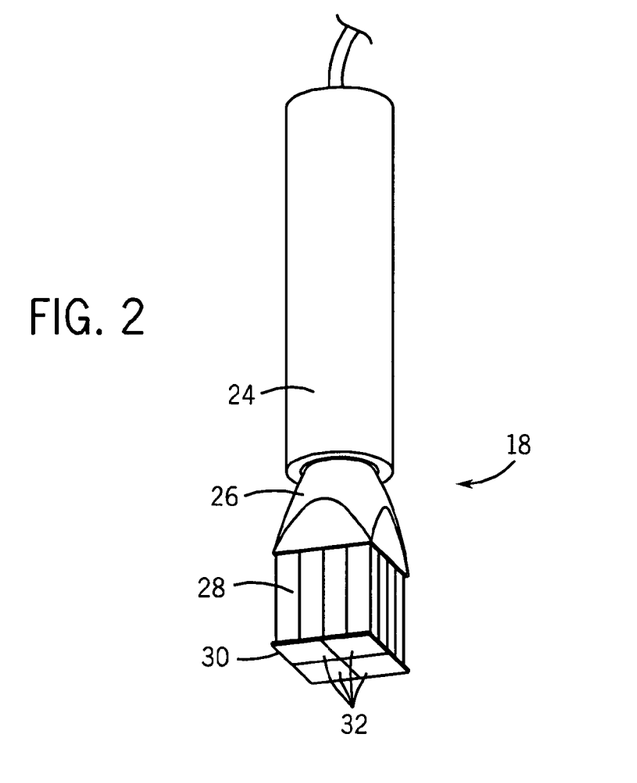
FIG. 2 is a perspective view of an exemplary detector module for use in a system of the type shown in FIG. 1.

As shown in FIG. 2, the detector module 18 in the exemplary embodiment includes a PMT 24, an optional waveguide 26, a scintillator 28, and a PSAPD array 30. Those skilled in the art will recognize that the scintillator 28 receives gamma rays emitted from decaying radioactive material within the subject to be imaged, and converts these gamma rays to photons that can be sensed by the PMT 24 and the PSAPD array 30. The waveguide 26 is simply used to channel the photons to the PMT, and essentially acts as an adaptor. Where the PMT 24 can be directly associated with the scintillator 28, the waveguide 26 may be eliminated from the assembly. Any suitable scintillator array may be employed in the module, such as lutetium-yttrium oxyorthosilicate (LYSO) scintillators. Other scintillator materials may, of course, be employed. As will be appreciated by those skilled in the art, the scintillator comprises multiple parallel crystals that convert gamma radiation to optical photons. The particular dimensions of the crystals will typically depend upon the nature of the material used for the scintillator and the spatial resolution requirements of the application. Moreover, as described below, a number of scintillator crystals will be typically be associated with each PSAPD 32 of the PSAPD array 30. This number may vary from 2×2 to 4×4 for each PSAPD (as described herein) and upwards to greater numbers, as required by the spatial resolution of the application and the scintillator material used.

In use, gamma rays impacting the scintillator array 28 are converted to optical photons which are transmitted to both the PMT 24 and to the PSAPDs of the array 30. Output signals locating the events in individual scintillator crystals are collected by grouped output channels to reduce the number of overall output channels in a manner described in greater detail below. As will be appreciated by those skilled in the art, then, in a time-of-flight PET system, the processing circuitry determines the location or position where the photon was detected based upon output from the PSAPDs, as described below. A single-channel PMT on the opposite face of the scintillator provides timing information. Energy information is determined by combining the signals from the PSAPDs and the PMT, and the relative signal levels on the two detectors provides DOI information.

Figure 3:
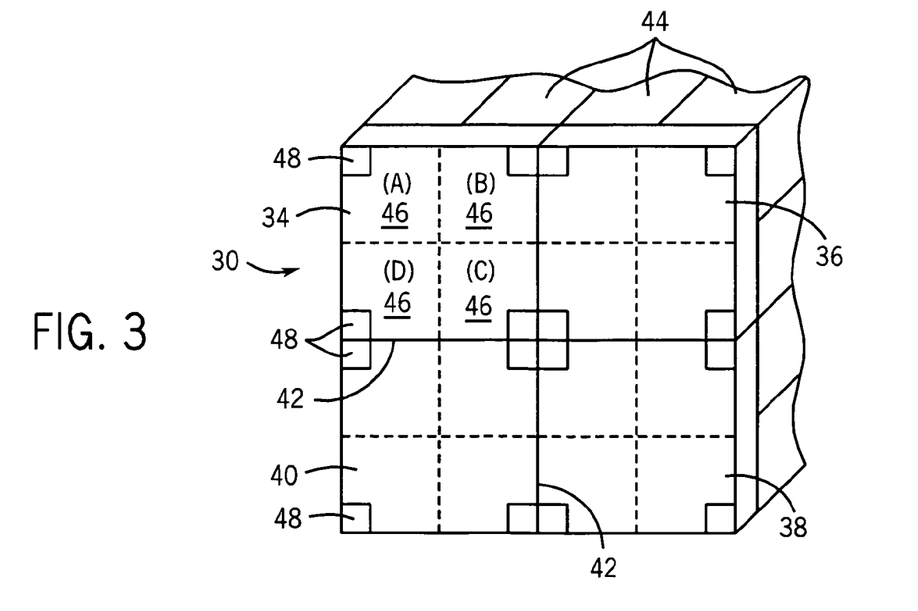
FIG. 3 is a detailed representation of a PSAPD array for use in a module of the type shown in FIG. 2.

FIG. 3 illustrates a more detailed representation of a 4-PSAPD array in which each PSAPD is disposed adjacent to an end or face of four scintillator crystals. Again, any number of grouped PSAPDs may be employed, and various numbers of scintillator crystals may be associated with each PSAPD. Four such PSAPDs in the grouping, and four crystals per PSAPD are illustrated and described herein by way of example only.

The PSAPD array 30 illustrated in FIG. 3 includes four PSAPDs, designated by reference numerals 34, 36, 38 and 40. Boundaries 42 separate the PSAPDs on a single chip or wafer. However, the boundaries 42 are quite thin, substantially thinner than boundaries that would result from separate PSAPDs grouped in an assembly. The scintillator crystals 44 extend from the PSAPD array. In a presently contemplated embodiment, the boundaries are trenches or grooves that separate the PSAPDs on the wafer. It may be possible, however, to obtain adequate results by juxtaposing PSAPDs formed on separate chips adjacent to one another with the connection and processing scheme outlined below.

The PSAPDs extend over an area corresponding to the face of multiple scintillator crystals as indicated above. In the embodiment illustrated in FIG. 3, because each of the PSAPDs covers faces of four scintillator crystals 44, each PSAPD may be considered as including four adjacent regions 46. As will be appreciated by those skilled in the art, each region may be referenced for locating a gamma ray incident event during operation. To facilitate the location of such events in the scintillator crystals, four contacts 48 are provided at corners of each PSAPD. While not shown in the figures, those skilled in the art will also appreciate that a thin resistivity layer is generally provided over each PSAPD to permit charge division between each of the corner contacts. While in FIG. 3 the contacts of adjacent corners of the PSAPDs are illustrated as directly juxtaposed, in practice the boundary 42 extends between these electrically isolating the contacts of each PSAPD.

As will be appreciated by those skilled in the art, the contacts of each PSAPD permit a determination to be made of the location at which a gamma ray was incident on the scintillator crystals 44 (and a resulting photon was incident on the PSAPD array). In particular, by use of Anger logic, a region 46 on each PSAPD corresponding to a scintillator crystal in which a gamma ray was received can be determined. If each of the four respective contacts on a PSAPD (at corners of the PSAPD) is designated by a respective letter A, B, C and D, in clockwise order, then, the approximate X and Y coordinates of a gamma ray incident event can be determined by the relationships:

$$X = \frac{(A+B)-(C+D)}{A+B+D+D}; \quad \text{eq. 1}$$

$$Y = \frac{(A+D)-(B+C)}{A+B+D+D}. \quad \text{eq. 2}$$

The particular quadrant or region where the gamma ray instant event occurred can thus be identified. As will also be appreciated by those skilled in the art, similar logic can be employed for locating incident events and photons with a different number of regions, particularly more than four regions as illustrated.

Figure 4:
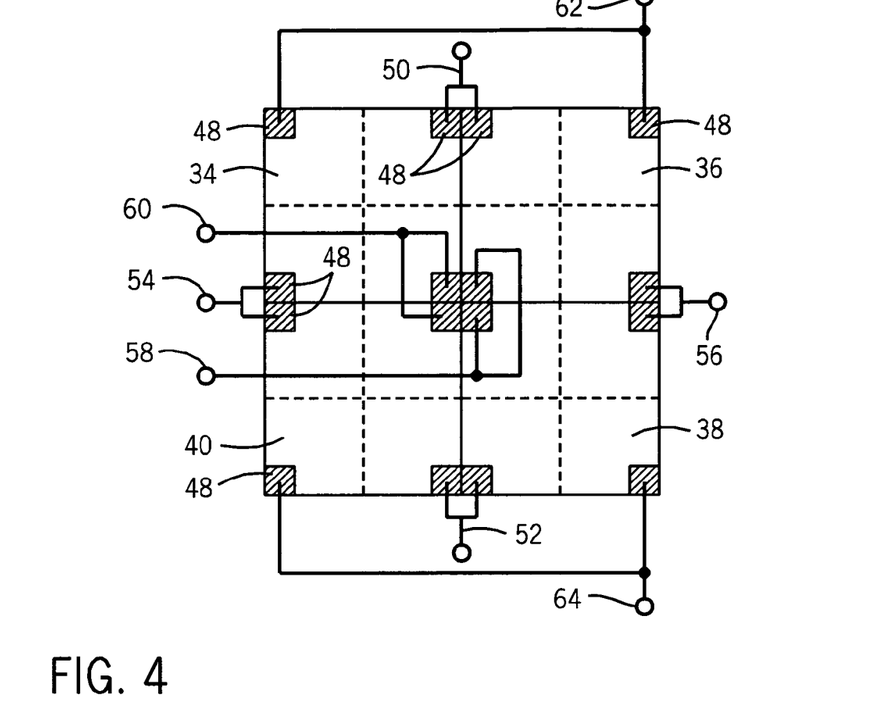
FIG. 4 is a diagrammatical representation of a first exemplary arrangement for extracting signals from a PSAPD array of the type shown in FIG. 3 while reducing the number of output channels to eight.

The foregoing logic for identification of the location of a gamma ray incident event would generally require that output signals be acquired from all four corners of each PSAPD. However, in accordance with the present invention, certain of the output contacts are joined by use of common connections to contacts of different PSAPDs in the array. FIG. 4 represents a first configuration in which the number of separate output channels in a 4-PSAPD array is reduced from 16 to 8. As can be seen in FIG. 4, the contacts 48 of each PSAPD 34, 36, 38 and 40 are grouped for readout. In the illustrated embodiment, a first common output channel 50 is coupled to corners of PSAPDs 34 and 36, while a similar common output channel 52 is coupled to contacts of PSAPDs 38 and 40. In a similar manner, common output channels 54 and 56 are coupled to contacts of PSAPDs 34 and 40, and 36 and 38, respectively. Similar common connections are made between corners of PSAPDs 36 and 38, and PSAPDs 34 and 40, as indicated by reference numerals 58 and 60, respectively. Finally, contacts of PSAPDs 34 and 36 are common to output channel 62, and contacts of PSAPDs 38 and 40 are common to output channels 64.

Figure 5:
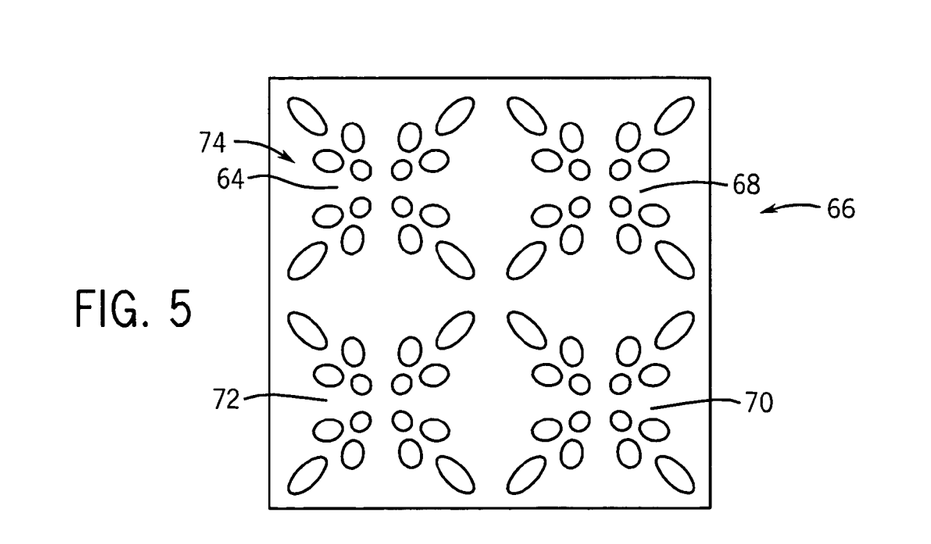
FIG. 5 is a line drawing representing a simulated mapping of locations of impact events of photons with an 8×8 scintillator crystal array, based upon signals output from the arrangement of FIG. 4.

In operation, the arrangement of FIG. 4 permits reading of the outputs from the various channels, and from the PSAPDs with fewer than 16 channels, but still permits distinguishing of the location within regions of each PSAPD of gamma ray incident events. FIG. 5 illustrates an exemplary mapping 66 of detection locations for outputs from the PSAPDs to locations of an 8×8 array of scintillator crystals associated with the PSAPDs. As shown in FIG. 5, multiple regions 64, 68, 70 and 72 correspond to the different respective PSAPDs of FIG. 4. The ellipsoids shown in FIG. 5 correspond to model locations of gamma ray incident events in a scintillator crystal. As will be appreciated by those skilled in the art, the "pin cushion" appearance of the mapping results generally from the variation in charge sharing with the resistance of the high resistivity layer of the PSAPDs, which depends on the distance from the point of impact to each of the corner contacts. The relative distinction of the ellipsoids, as designated by reference numeral 74, indicates that the location of gamma ray incident events can be distinguished to provide sufficient position sensitivity during operation.

Figure 6:
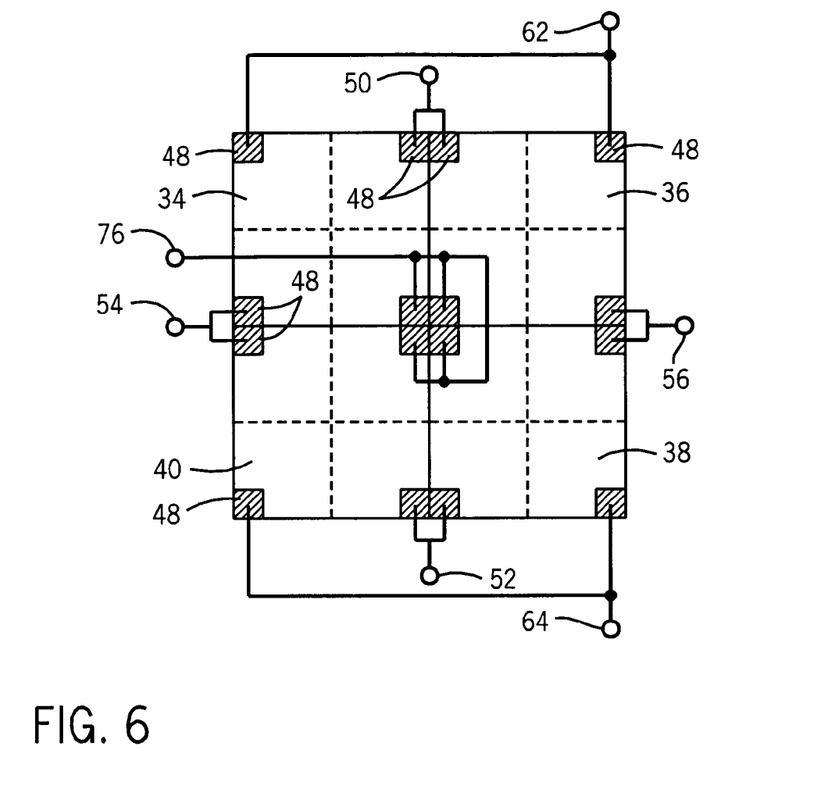
FIG. 6 is a diagrammatical representation of an exemplary arrangement for extracting signals from a PSAPD array similar to FIG. 4, but with seven output channels.
Figure 7:
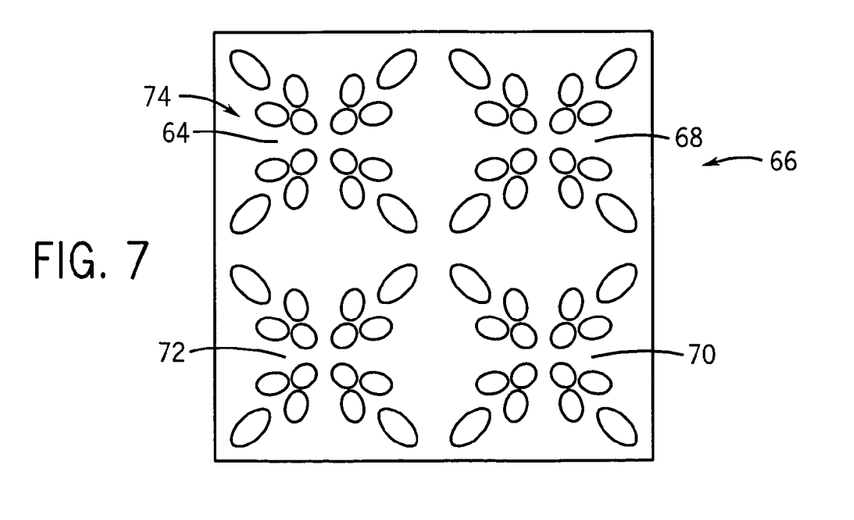
FIG. 7 is a line drawing of a simulated mapping similar to that of FIG. 5, but based upon the arrangement of FIG. 6.

FIG. 6 is a diagrammatical representation of a common output connection arrangement similar to that shown in FIG. 4, but with seven output channels for the four PSAPD array. In contrast to the arrangement of FIG. 4, that of FIG. 6 groups center contacts of all four PSAPDs in a common output channel 76. FIG. 7 is a simulated mapping similar to that of FIG. 5, indicating good spatial resolution of gamma ray incident events by analysis of outputs from the channels of FIG. 6.

Figures 8, 9:
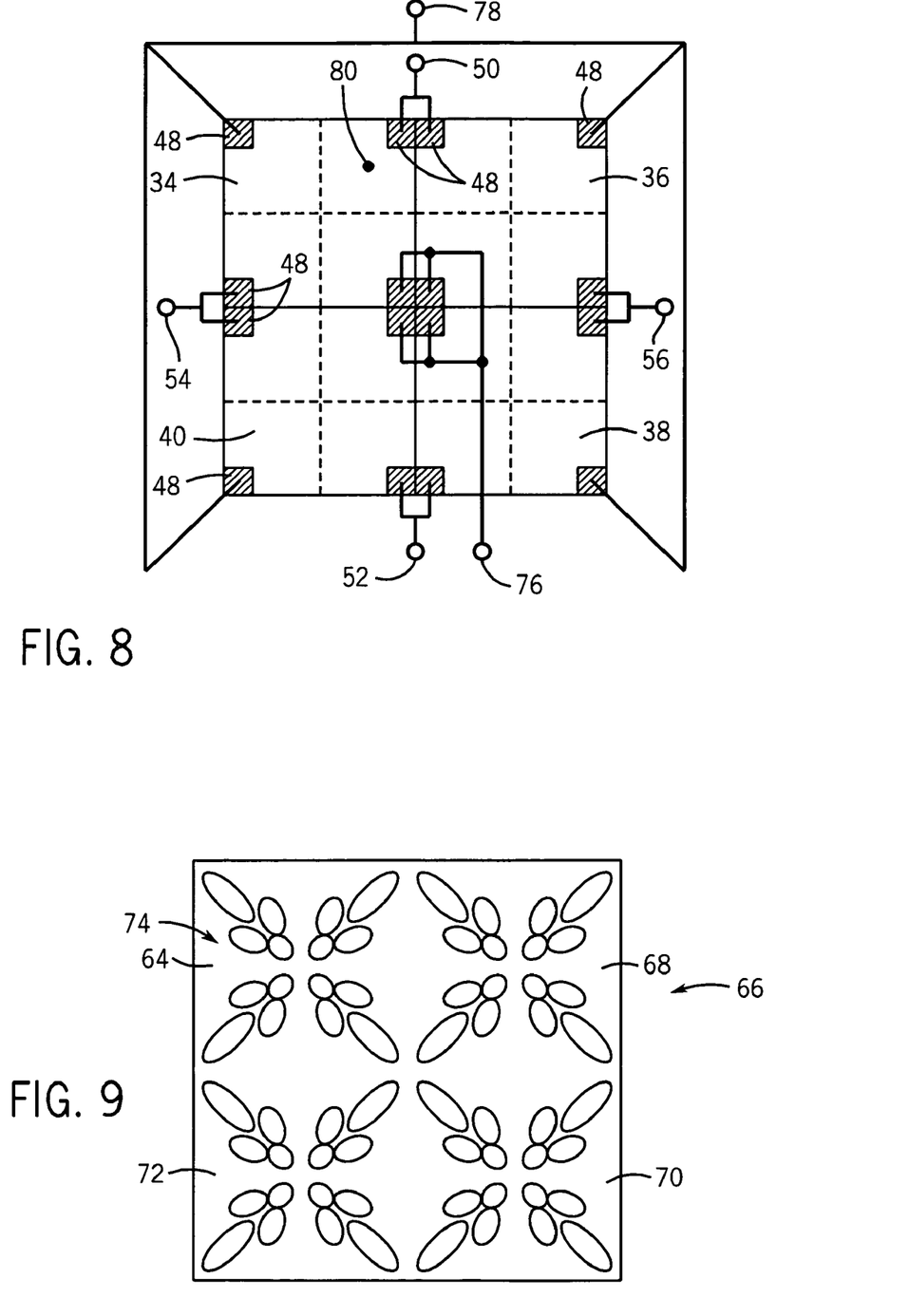
FIG. 8 is a further alternative arrangement for extracting signals from an exemplary PSAPD array using six output channels.
FIG. 9 is a line drawing of a simulated mapping similar to that of FIGS. 5 and 7, but using the arrangement of FIG. 8.

The number of output channels may be further reduced as indicated diagrammatically in FIG. 8. In the embodiment of FIG. 8, the four central contacts of the PSAPDs of the array are again grouped in a common output channel 76, but all four exterior corners of the PSAPDs are also grouped into a common output channel 78. Thus, locations of incident events can be made in the arrangement of FIG. 8 by reference to only six output channels. The simulation illustrated in FIG. 9 indicates that some relatively small increase in the degree of uncertainty exists in locating incident events as the total number of output channels is reduced, but such events can still be distinguished in the different regions of each PSAPD of the array.

As noted above, any number of PSAPDs may be included in the array, and each PSAPD may be subdivided into any number of sub-regions corresponding to the number of scintillator crystals adjacent to which the PSAPDs are positioned. Referring still to FIG. 8, upon impact of a gamma ray (and corresponding photon) at a location 80, exemplary logic for locating a scintillator crystal in which a gamma ray incident event has occurred based upon output of the various channels may proceed as follows. First, output from channels 54 and 56 are compared, and because the output from channel 54 will exceed that from output channel 56, the event will be located on the left side of the array. Similarly, output from channels 50 and 52 can be compared, and a greater signal from output channel 50 will locate the event in the upper half of the array. Subsequently, signals from channels 50, 54, 76 and 78 can be used with the Anger logic discussed above to locate the position 80 in the upper right quadrant of PSAPD 34.

It should be noted that signal processing may also permit the correlation of noise in output signals to improve the localization of gamma ray incident events. For example, for an event occurring at location 80 in FIG. 8 it may be noted that the output from channel 56 will not be directly involved in the foregoing Anger logic for location of the event within the PSAPD 34. However, noise from channel 56 could be used to partially correct the signal from channels that are involved in the Anger logic location determination, such as channel 50. In practice, the noise from each output channel will not typically be identical, such that such corrections may only be partial.

It should also be noted that, as mentioned above, the present common connection and readout techniques may also be used with devices other than PSAPDs. For example, the same connection schemes may be used with charge sharing position-sensitive photosensors, such as position-sensitive multianode photomultipliers (PMTs) using charge division, position-sensitive photodiodes (without avalanche gain operation), arrays of silicon photomultipliers with charge sharing, and so forth.

By way of example, in certain position-sensitive photomultiplier tubes, outputs are coupled to a network of resistors. The total number of output channels from such resistor networks may be reduced by application of the present invention. That is, outputs can be connected in common to certain of the outputs, and the logic discussed above used to distinguish signals from the various locations in the sensor array.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A photodetector comprising:
an array of photosensors, each photosensor in the array including a plurality of output contacts; and
a plurality of output connections electrically coupled to the output contacts of the photosensors, wherein at least one of the output connections is common to output contacts of at least two different photosensors.

2. The photodetector of claim 1, wherein the photosensors are position-sensitive photodiodes.

3. The photodetector of claim 1, wherein the photosensors are position-sensitive avalanche photodiodes.

4. A photodetector comprising:
a photodiode array including a plurality of position-sensitive avalanche photodiodes, each photodiode including an output contact at corners thereof; and
a plurality of output connections electrically coupled to the output contacts of the photodiodes, wherein at least one of the output connections is common to output contacts of at least two different photodiodes.

5. The photodetector of claim 4, wherein the photodetector includes a plurality of photodiodes on a single wafer, each of the photodiodes being separated from one another by a trench or groove.

6. The photodetector of claim 4, wherein the common connection is common to output contacts of more than two different photodiodes.

7. The photodetector of claim 4, wherein the common connection is common to output contacts of four different photodiodes.

8. The photodetector of claim 4, wherein a plurality of the output connections are common to respective output contacts of at least two different photodiodes.

9. The photodetector of claim 4, wherein the photodiode array is disposed adjacent to a face of a scintillator.

10. The photodetector of claim 9, further comprising a photomultiplier tube disposed adjacent to an opposite face of the scintillator.

11. The photodetector of claim 10, further comprising a waveguide disposed between the scintillator and the photomultiplier tube.

12. A photodetector comprising:
a scintillator for receiving gamma rays and converting the gamma rays into lower energy photons;
a photomultiplier tube disposed at a face of the scintillator; and
a photodiode array including a plurality of position-sensitive avalanche photodiodes, each photodiode including an output contact at corners thereof, and a plurality of output connections electrically coupled to the output contacts of the photodiodes, wherein at least one of the output connections is common to output contacts of at least two different photodiodes.

13. The photodetector of claim 12, further comprising a waveguide disposed between the scintillator and the photomultiplier tube.

14. The photodetector of claim 12, wherein the photodetector includes a plurality of photodiodes on a single wafer, each of the photodiodes being separated from one another by a trench or groove.

15. The photodetector of claim 12, wherein the common connection is common to output contacts of more than two different photodiodes.

16. The photodetector of claim 12, wherein the common connection is common to output contacts of four different photodiodes.

17. The photodetector of claim 12, wherein a plurality of the output connections are common to respective output contacts of at least two different photodiodes.

18. A photodetector readout method comprising:
detecting output signals from a photodiode array including a plurality of position-sensitive avalanche photodiodes, each photodiode including an output contact at corners thereof, and a plurality of output connections electrically coupled to the output contacts of the photodiodes, wherein at least one of the output connections is common to output contacts of at least two different photodiodes;

analyzing the output signals to determine a photodiode in the array adjacent to which a radiation incident event occurred.

19. The method of claim 18, wherein output signals from multiple common output connections are compared to determine the photodiode adjacent to which the radiation incident event occurred.

20. The method of claim 18, comprising analyzing the output signals to determine a region of one of the photodiodes adjacent to which the radiation incident event occurred.

21. The method of claim 20, wherein each photodiode is subdivided into four regions, and the radiation incident event is located in one of the regions of one of the photodiodes via Anger logic based on the output signals.

22. A PET imaging system comprising:

a detector for receiving gamma radiation from a subject of interest, the detector including a scintillator for receiving gamma rays and converting the gamma rays into lower energy photons, a photomultiplier tube disposed at a face of the scintillator, and a photodiode array including a plurality of position-sensitive avalanche photodiodes, each photodiode including an output contact at corners thereof, and a plurality of output connections electrically coupled to the output contacts of the photodiodes, wherein at least one of the output connections is common to output contacts of at least two different photodiodes; and a signal processor for analyzing output signals from the output connections to determine a photodiode in the array adjacent to which a gamma ray was received by the scintillator.

23. The system of claim 22, wherein the signal processor is configured to analyze the output signals to determine a region of one of the photodiodes adjacent to which a gamma ray was received by a scintillator crystal of the scintillator.

* * * * *